US008010814B2

(12) United States Patent
Byun et al.

(10) Patent No.: US 8,010,814 B2
(45) Date of Patent: Aug. 30, 2011

(54) APPARATUS FOR CONTROLLING POWER MANAGEMENT OF DIGITAL SIGNAL PROCESSOR AND POWER MANAGEMENT SYSTEM AND METHOD USING THE SAME

(75) Inventors: Kyung-Jin Byun, Daejon (KR);
Bon-Tae Koo, Daejon (KR);
Nak-Woong Eum, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 965 days.

(21) Appl. No.: 11/936,672

(22) Filed: Nov. 7, 2007

(65) Prior Publication Data
US 2008/0133948 A1 Jun. 5, 2008

(30) Foreign Application Priority Data

Dec. 4, 2006 (KR) .................. 10-2006-0121438
Apr. 10, 2007 (KR) .................. 10-2007-0035237

(51) Int. Cl.
*G06F 1/32* (2006.01)

(52) U.S. Cl. ........................... 713/320; 713/300
(58) Field of Classification Search .............. 713/320, 713/324
See application file for complete search history.

(56) References Cited

U.S. PATENT DOCUMENTS

| 5,034,962 | A | * | 7/1991 | Yamamoto et al. ........... 375/222 |
| 5,910,930 | A | * | 6/1999 | Dieffenderfer et al. ....... 368/156 |
| 6,519,706 | B1 | | 2/2003 | Ogoro |
| 6,651,176 | B1 | * | 11/2003 | Soltis et al. ................... 713/300 |
| 6,658,578 | B1 | * | 12/2003 | Laurenti et al. ............... 713/324 |
| 6,704,879 | B1 | * | 3/2004 | Parrish .......................... 713/322 |

FOREIGN PATENT DOCUMENTS

| KR | 10-1997-0002549 | 1/1997 |
| KR | 2002-0014534 | 2/2002 |
| KR | 20040067063 | 7/2004 |

\* cited by examiner

*Primary Examiner* — Chun Cao
(74) *Attorney, Agent, or Firm* — Rabin & Berdo, P.C.

(57) ABSTRACT

Provided are an apparatus for controlling power management of a DSP (Digital Signal Processor) and a power management system and method using the same. The power management system includes a command decoding device for decoding a program into which a PSM (Power Saving Mode) command and a general command are inserted and transmitting module information required for execution of a corresponding command to a power management control apparatus at the time of decoding the corresponding command; a pipeline control device for blocking and restarting the transmission of data through a pipeline upon receipt of a pipeline control signal (pipeline stall) from the power management control device; and the power management control apparatus for controlling power in respective modules by setting/resetting corresponding bits of a PSM status register and a PSM flag register in accordance with the PSM command and the general command decoded in the command decoding device.

14 Claims, 6 Drawing Sheets

APPARATUS FOR CONTROLLING POWER MANAGEMENT OF DIGITAL SIGNAL PROCESSOR AND POWER MANAGEMENT SYSTEM AND METHOD USING THE SAME

CROSS-REFERENCES TO RELATED APPLICATIONS

The present invention claims priority of Korean Patent Application Nos. 10-2006-0121438 and 10-2007-0035237, filed on Dec. 4, 2006, and Apr. 10, 2007, respectively, which are incorporated herein by reference.

BACKGROUND OF THE INVENTION

1. Field of the Invention

The present invention relates to an apparatus for controlling power management of a DSP (Digital Signal Processor) and a power management system and method using the same; and, more particularly, to an apparatus for controlling power management of a DSP, which controls dynamic power consumption and static power consumption in the DSP in modules, which are fine, so as to reduce overall power consumption, and a power management system and method using the same.

This work was supported by the Information Technology (IT) research and development program of the Korean Ministry of Information and Communication (MIC) and the Korean Institute for Information Technology Advancement (IITA) [2006-S-048-01, "Embedded DSP Platform for Audio/Video Signal Processing"].

2. Description of Related Art

Recently, a high capacity digital signal processing function has been required for mobile communication systems and digital multimedia equipment. Thus, in order to efficiently process such a high capacity operation, most of equipments employ an embedded DSP.

Further, as various home appliances used in daily life, as well as modern advanced equipments, are becoming more diversified and complicated in their functions, the demand for DSPs is increasing.

DSPs mounted in these equipments require much power because they have to process a high capacity operation. Accordingly, schemes for reducing power consumption are being an issue. Especially, in mobile equipments, the low power problem of the embedded digital signal processor is known as one of the most important problems.

Further, since recent digital multimedia terminals have to support a variety of applications, the embedded DSP also has to process a variety of application programs.

At this time, by taking into account that there is a large difference in the scope of resources required in accordance with application programs, the specification of the DSP embedded in a system must meet the specification required by an application program having the highest complexity among the programs that have to be executed in the DSP.

Therefore, when a program having a low complexity is executed in the DSP having such a high specification, this is not efficient because unnecessary resources of the DSP have to consume power.

To overcome this, a conventional DSP employs commands for reducing power consumption, such as an IDLE command, and has the control function capable of reducing power consumption in several steps depending on an operating state.

That is to say, the conventional DSP has a dynamic type that reduces power consumption by controlling clocks for a core unit, a peripheral unit, and a memory unit as an application program in execution finishes the operation within a preset period of time. Thus, such a conventional DSP cannot perform power control in modules, which are finer than units, and cannot also support a static type that controls power itself, thus failing to efficiently reduce power consumption.

Especially, when considering that static power consumption is becoming gradually important as compared to dynamic power consumption as a recent semiconductor process becomes finer into nano unit, power control in modules (blocks), which is finer, is essentially required.

SUMMARY OF THE INVENTION

It is, therefore, an object of the present invention to provide an apparatus for controlling power management of a DSP, which controls dynamic power consumption and static power consumption in the DSP in modules, which are fine, to thereby reduce overall power consumption, and a power management system and method using the same.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a power management system of a digital signal processor, the system including: a command decoding device for decoding a program into which a PSM (Power Saving Mode) command and a general command are inserted and transmitting module information required for execution of a corresponding command to a power management control apparatus at the time of decoding the corresponding command; a pipeline control device for blocking and restarting the transmission of data through a pipeline upon receipt of a pipeline control signal (pipeline stall) from the power management control device; and the power management control apparatus for controlling power in respective modules by setting/resetting corresponding bits of a PSM status register and a PSM flag register in accordance with the PSM command and the general command decoded in the command decoding device.

In accordance with another aspect of the present invention, there is provided a power management method of a digital signal processor, the method including the steps of: a) upon receipt of a PSM command, setting/resetting bits of a corresponding module in a PSM status register in accordance with the PSM command; b) setting bits of a corresponding module in a PSM flag register upon receipt of module information required to execute a general command; and c) controlling power in respective modules depending on the status of the bits of the corresponding module of the PSM status register and the PSM flag register.

In accordance with another aspect of the present invention, there is provided a power management control apparatus of a digital signal processor, the apparatus including: a PSM status register for storing bits of a corresponding module in accordance with a PSM command; a PSM flag register for storing bits of a corresponding module in accordance with a general command; and a power management controller for setting/resetting bits of the PSM status register and the PSM flag register in accordance with a PSM command and a general command decoded by an external command decoding device to control power in respective modules.

Further, the present invention reduces power consumption of a DSP by cutting off power in modules, which are smaller, in order to reduce dynamic power consumption and static power consumption, by taking into account that static power consumption is becoming relatively more and more important as compared to dynamic power consumption as a recent semiconductor process becomes finer into nano unit.

Moreover, the present invention provides a method capable of reducing power consumption in a DSP. Especially, by providing a method capable of cutting off power in modules, which are smaller as compared to the existing method of reducing dynamic power consumption by cutting off supply of clocks to an entire DSP core or decreasing the frequency of clocks, the present invention can control dynamic power consumption and static power consumption more finely, thereby reducing power consumption more efficiently. Such a low-power DSP is very useful in the fields where low power consumption is important, such as multimedia terminals showing an explosive increase in demand in recent years, as well as in DSPs used in general home appliances.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
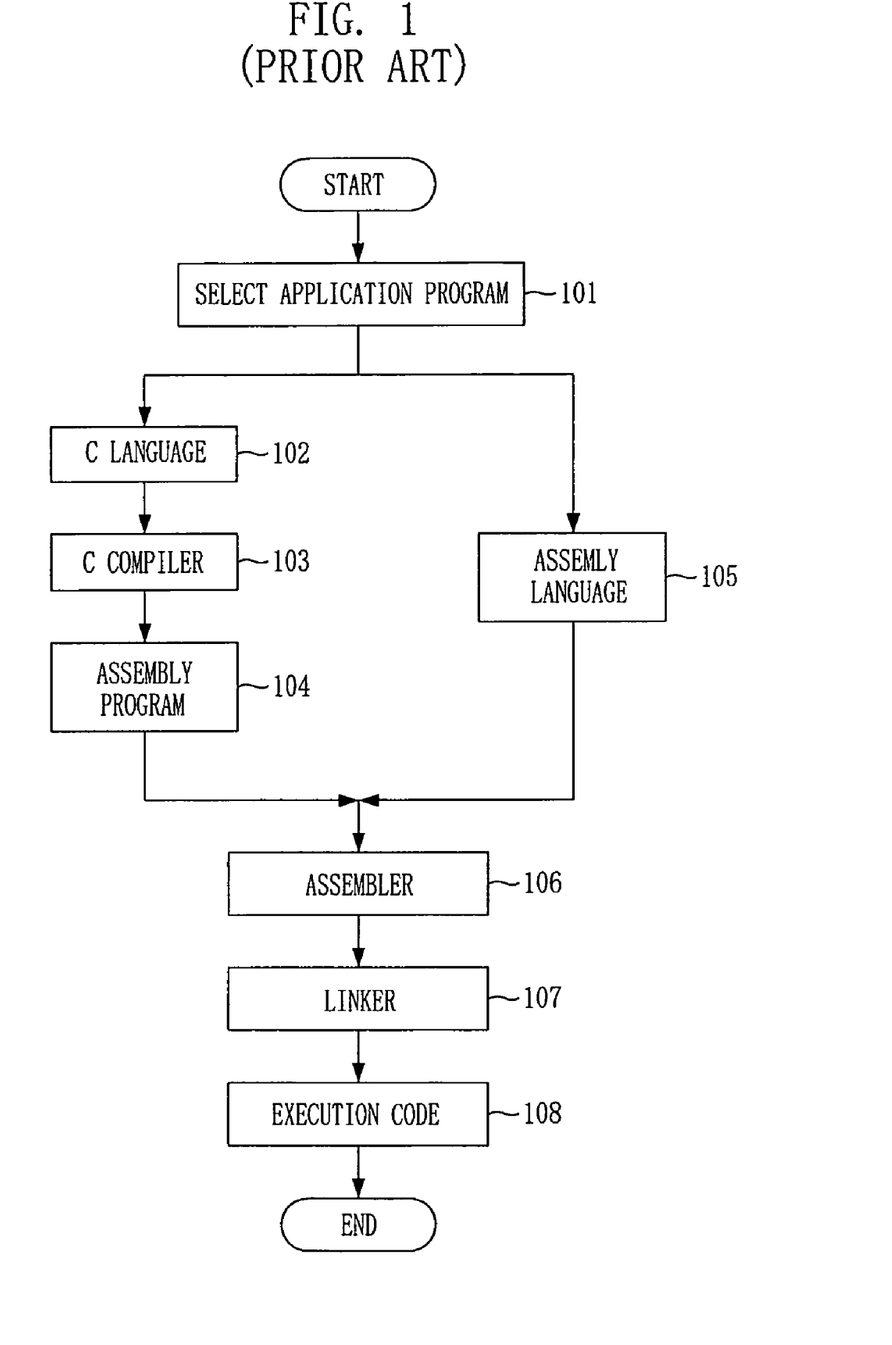
FIG. 1 is a flowchart describing one example of a method for creating an application program for a conventional DSP.

FIG. 1 is a flowchart describing one example of a method for creating an application program for a conventional digital signal processor.

As shown in FIG. 1, an application program to be mounted in a DSP may be created in an easily programmable C language, or in an assembly language for a more efficient program. It is of course obvious that such an application program may be created in other languages similar to the above languages.

In case of creating it in C language, an assembly program is first created by using a C compiler in order to be mounted in a DSP, and then an execution code can be acquired by using an assembler and a linker, as shown in blocks 101 to 108.

However, in case of creating it in an assembly language 105, an execution code (program) can be acquired immediately by using an assembler 106 and a linker 107, as shown in a block 108.

By these respective procedures, an execution code executable in the DSP can be acquired.

Figure 2:
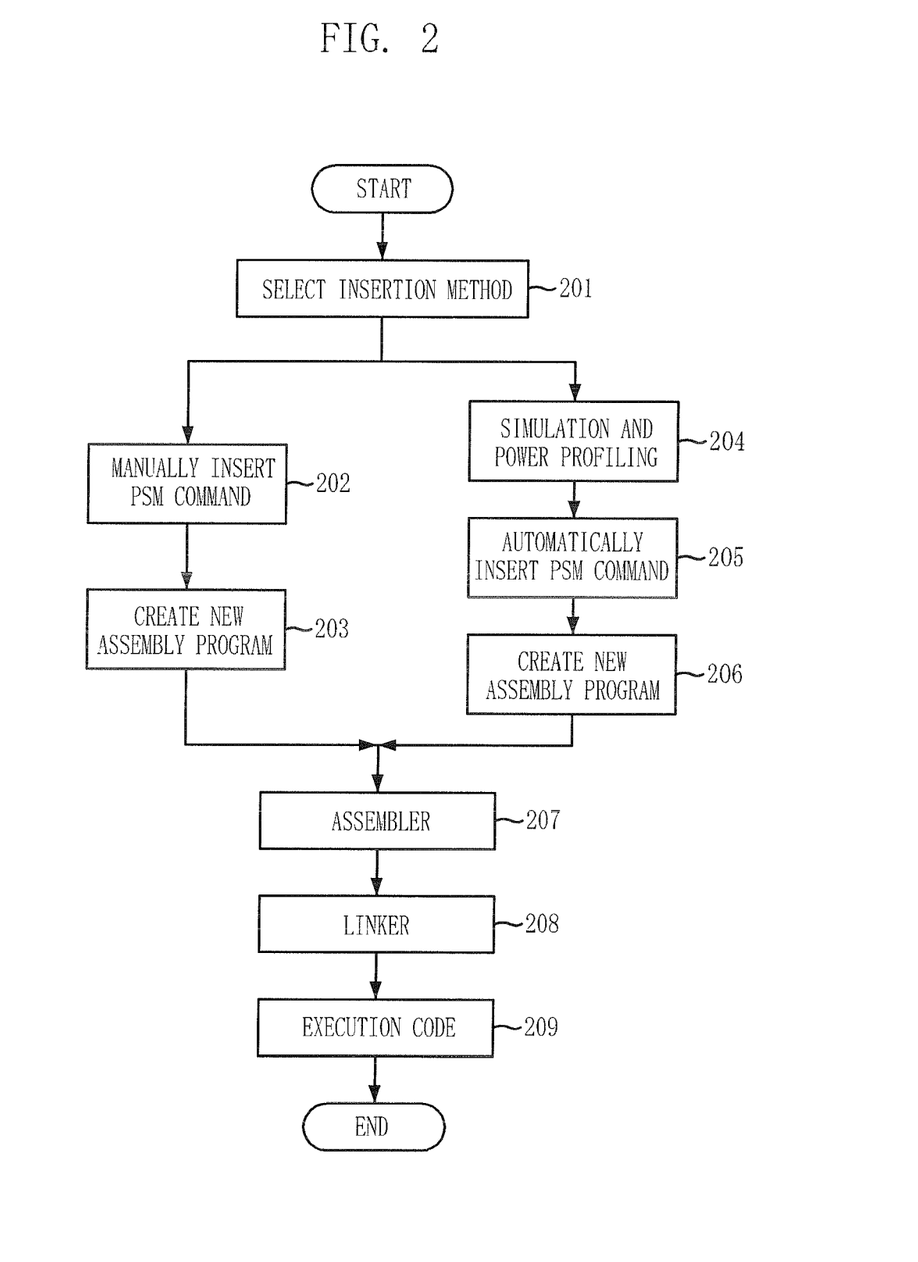
FIG. 2 is a flowchart describing one example of a method of inserting a PSM command into a program used in the present invention.

FIG. 2 is a flowchart describing one example of a method of inserting a PSM command into a program used in the present invention.

As shown in FIG. 2, a PSM (power saving mode) command can be inserted into a program in two ways.

First, in case of directly creating it in an assembly language, a programmer creates a new assembly program by directly inserting a PSM command through simulation, and then acquires a new execution code through an assembler 207 and a linker 208, as shown in blocks 201 to 203 and 207 to 209.

However, in case of the assembly program acquired through the C compiler, it is impossible to directly insert a PSM command. Thus, a created assembly code is analyzed through simulation and power profiling, and then a new assembly program is created by finding out any module that has not been used in the program for a predetermined time and automatically inserting a command for cutting off/supplying power to the module, and then a new execution code is acquired through the assembler 207 and the liner 208, as in shown in blocks 204 to 209.

Preferably, the newly acquired assembly program by inserting the power cutoff/supply command is verified whether there is any error caused by the PSM command inserted by simulation.

Further, because the PSM command is a command that stops or starts the supply of power, it is necessary to check whether the overall power consumption decreases or increases by taking into account an overhead caused by the start and stop of power supply, and the time taken until a corresponding module becomes a normal state.

In addition, it is verified by simulation whether the result of execution of the new assembly code, into which the PSM command is inserted, verifies is consistent with the result of execution of the previous assembly code.

Besides, the simulator has to support such a PSM command so as to check as to what extent power consumption decreases through power profiling of the new code and include the power profiling function as well.

Figure 3:
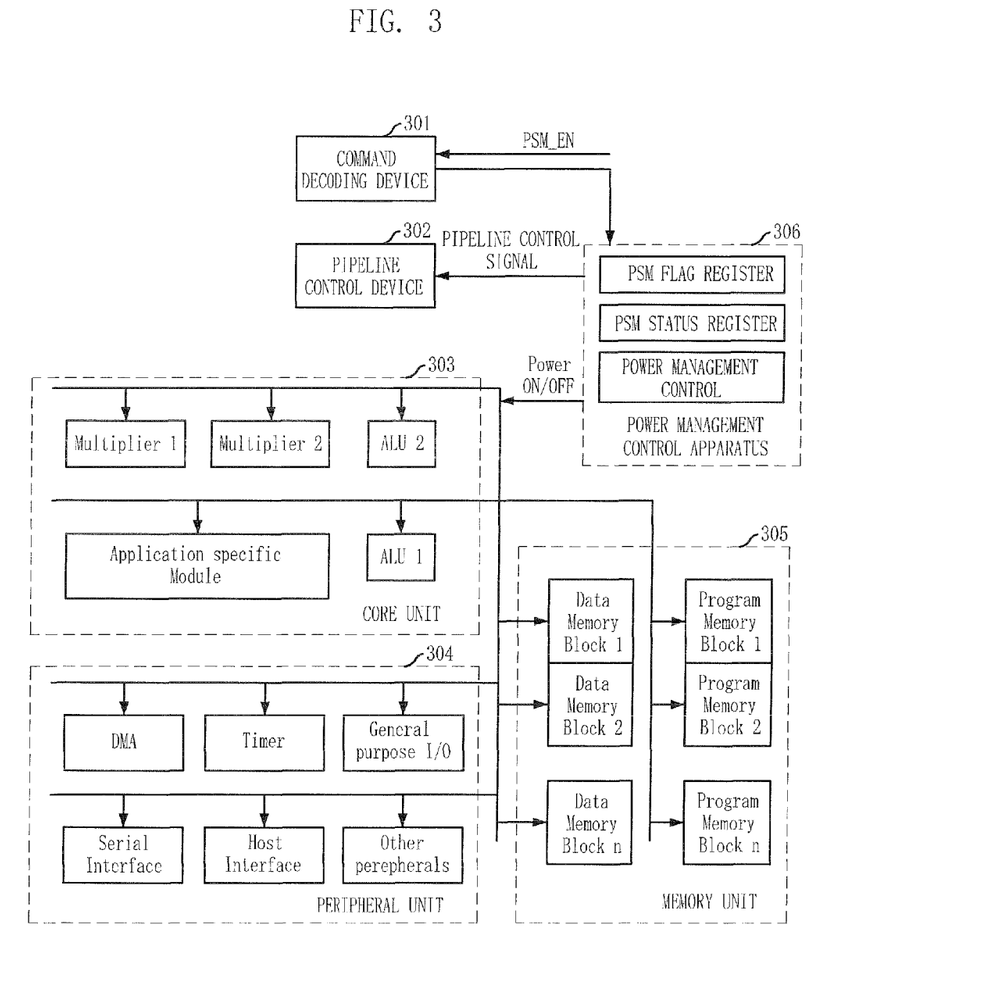
FIG. 3 is a block diagram illustrating an apparatus for controlling power management of a DSP and a power management system using the same, in accordance with preferred embodiments of the present invention.

FIG. 3 is a block diagram illustrating an apparatus for controlling power management of a DSP and a power management system using the same, in accordance with preferred embodiments of the present invention.

As shown in FIG. 3, the power management system of a DSP in accordance with the present invention includes a command decoding device 301 for decoding a program with a PSM (Power Saving Mode) command and a general command inserted therein and transmitting module information required for execution of a command to a power management control apparatus 306 at the time of decoding the command, a pipeline control device 302 for blocking and restarting the transmission of data through a pipeline upon receipt of a pipeline control signal (pipeline stall) from the power management control apparatus 306, a core unit 303 having a plurality of MUs (multipliers) and ALUs (Arithmetic Logic Units) and application specific modules, a peripheral unit 304 having a plurality of peripheral equipments, a memory unit 305 having a plurality of data memory blocks and a plurality of program memory blocks, and the power management control apparatus 306 for setting/resetting bits of a corresponding module in accordance with the PSM command in a PSM (power saving mode) status register 401 upon receipt of the PSM command from the command decoding device 301 and setting bits of a corresponding module to 1 in a PSM flag register 402 upon receipt of module information required to execute a general command from the command decoding device 301 and then setting the bits of the corresponding module of the PSM status register 401 to 1 to supply power to the corresponding module.

That is, if the bits of the corresponding module of the PSM status register are set, the power management control apparatus 306 sets the bits of the corresponding module of the PSM flag register to control power supply to the corresponding module, and if the bits of the corresponding module of the PSM status register are not set, it sets the bits of the corresponding module in the PSM flag register and transmits a pipeline control signal (pipeline stall) to the pipeline control device 302 to stop the execution of a pipeline, and then sets the bits of the corresponding module in the PSM status register to control power supply to the corresponding module.

Here, the power management control apparatus 306 comprises a PSM status register for storing bits of a corresponding module in accordance with a PSM command, a PSM flag register for storing bits of a corresponding module in accordance with a general command, and a power management controller for setting/resetting bits of a corresponding module in the PSM status register upon receipt of the PSM command and setting bits of a corresponding module to 1 in the PSM flag register upon receipt of module information required to execute a general command and then setting the bits of the corresponding module of the PSM status register to 1 to supply power to the corresponding module.

Figure 4:
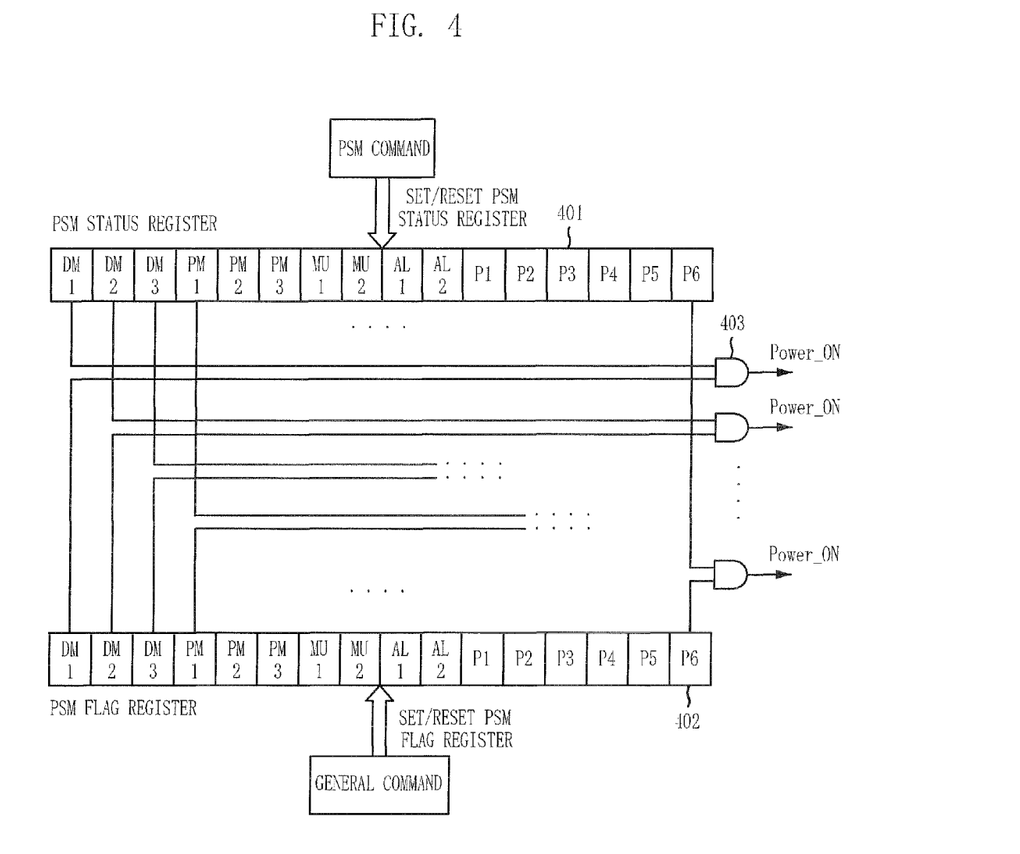
FIG. 4 is a structural view describing the apparatus for controlling power management of a DSP in accordance with the present invention.

The operation of the power management control apparatus 306 will be described with reference to FIG. 4. After the bits of the corresponding module are set to 1 in the PSM flag register 402, if the bits of the corresponding module of the PSM status register 401 are not set to 1, this means that the power to the corresponding module required to execute the general command is cut off. Thus, a pipeline control signal (pipeline stall) is transmitted to the pipeline control device 302 to stop the execution of a pipeline and then the bits of the corresponding module are set to 1 in the PSM status register 401, and power is supplied to restart the execution of the pipeline when the corresponding module reaches a normal state.

This will be described in more detail with reference to FIG. 4. With the corresponding bits of the PSM status register 401 already set/reset by the PSM command, the controller of the power management control apparatus 306 receives module information required for the operation of the command being currently executed in a general command decoding process and sets the corresponding bits of the PSM flag register 402.

For example, if only the DM1 bit of the PSM status register 401 is 1, this means that the power of data block memory 1 is currently cut off. In this state, when a command using the data memory block 1 DM1 is entered, the DM1 bit of the PSM flag register 402 is set to 1 when decoding the command.

Then, an AND gate 403 outputs a power-on signal Power_ON indicating that power should be supplied to a DM1 module.

Meanwhile, upon receipt of an external control signal PSM_EN capable of enabling/disabling the execution of a PSM command from the outside of the DSP, the command decoding device 301 executes the PSM command if the external control signal is a control signal enabling the execution of the PSM command, and it ignores the PSM command and substitutes it by a NoP (No Operation) command for the PSM command if the external control signal is a control signal disabling the execution of the PSM command.

Further, in the present invention, when the execution of the program done as in a typical DSP is finished, power and clocks with respect to the core unit 303, the peripheral unit 304, and the memory unit 305 can be controlled by using an IDLE command.

Further, in the present invention, in case a module for cutting off/supplying power is predicted through simulation and power profiling and a program with a PSM command for this module inserted therein is used, it is considered that this prediction may not come true when the program is actually executed in real time in the DSP. Thus, in case the module, which power is cut off by a power-off command inserted, is required during the execution of the program, the pipeline is temporarily stopped and then power is supplied to a required module so as to continue the execution.

Figure 5:
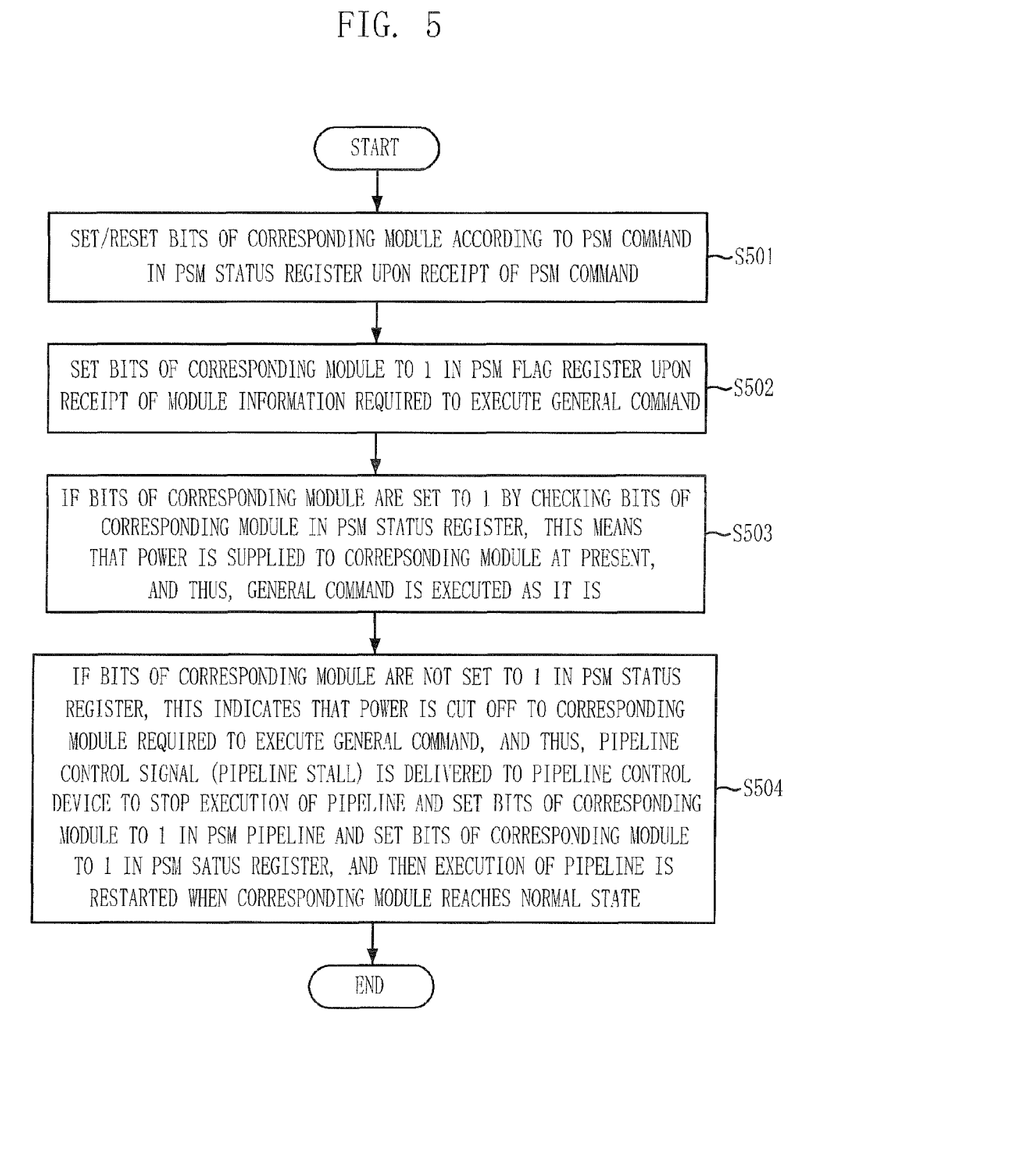
FIG. 5 is a flowchart describing a power management method of a DSP in accordance with another preferred embodiment of the present invention.

FIG. 5 is a flowchart describing a power management method of a DSP in accordance with another embodiment of the present invention.

First, upon receipt of a PSM command from the command decoding device 301, the PSM status register 401 set/resets bits of a corresponding module in accordance with the PSM command in step S501.

Thereafter, upon receipt of module information required to execute a general command from the command decoding device 301, the PSM flag register 402 sets bits of a corresponding module to 1 in step S502.

Next, the PSM status register 401 checks the bits of the corresponding module, and if the bits of the corresponding module are set to 1, the general command is executed as it is since power is currently being supplied to the corresponding module in step S503.

On the other hand, if the bits of the corresponding module are not set to 1 in the PSM status register 401, this means that power to the corresponding module required to execute the general command is cut off. Thus, a pipeline control signal (pipeline stall) is transmitted to the pipeline control device 302 to stop the execution of the pipeline and set the bits of the corresponding module to 1 in the PSM status register 401, and then control is done so that power is supplied to the corresponding module, to restart the execution of the pipeline when the corresponding module reaches a normal state.

Hereinafter, the operation of the power management control apparatus 306 will be described in more detail with reference to FIG. 6.

Figure 6:
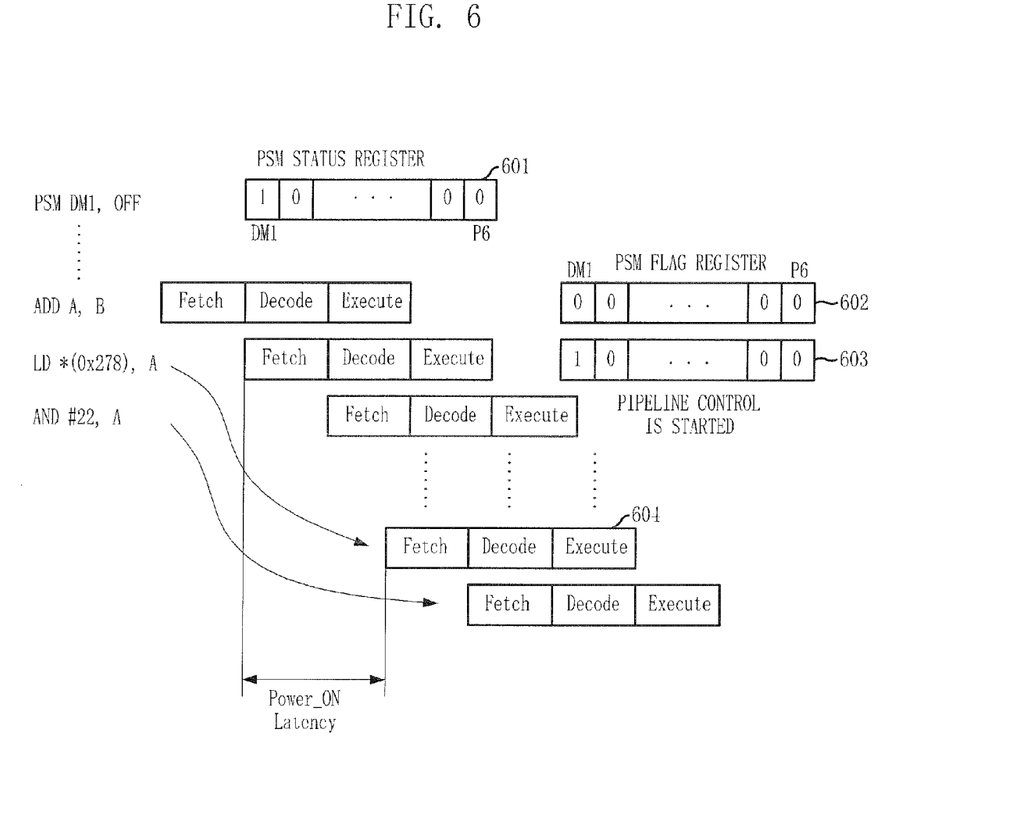
FIG. 6 is an operation explanatory view of the apparatus for controlling power management in accordance with the present invention.

As shown in FIG. 6, as the DM1 bit of the PSM status register 401 is set to 1 as shown by reference numeral 601, and the DM1 bit of the PSM flag register 402 is reset to 0 as shown by reference numeral 602, the power management control apparatus 306 receives DM1 information from the command decoding device 301 in the procedure of decoding a command requiring the operation of DM1, with power to the DM1 module being cut off, and sets the DM1 bit of the PSM flag register 402 to 1 as shown by reference numeral 603, and power is supplied to the DM1 module to stop the execution of the pipeline until the DM1 module reaches a normal state, i.e., during the 'power_ON latency' time, and then the pipeline is again executed when the DM1 module reaches a normal state as shown by reference numeral 604, thereby normally executing the command.

In this case, only power_OFF commands are included as in the following example.

```
         * If there are power off commands only
         PSM    DM1, OFF           ; power off of data memory
block 1
         ...
         ...
         ...
         ADD    A, B
         SUB    #0x67, B
         SFT    B, 12
         ST     B, *(0x8793)
         LD     *(0x1234), A       ; command using data memory
block 1
         AND    #0x78, A
``` wherein "LD*(0×1234), A" command stops the execution of the pipeline, and then executes the pipeline again after power supply and thereafter the 'power_ON latency' time.

On the contrary, if a power supply command is included, a module requiring power can be predicted in advance to supply power. Thus, the processing can be done immediately without power_ON latency time for stopping the pipeline until the corresponding module is normally operated after the power supply, thereby reducing the overhead caused by program execution.

```
         * if there are power off and supply commands
         PSM    DM1, OFF           ; power off of data memory
block 1
         ...
         ...
         ...
         ADD    A, B
         PSM    DM1, OFF           ; supply power to data
memory block 1 in advance
         SUB    #0x67, B
         SFT    B, 12
         ST     B, *(0x8793)
         LD     *(0x1234), A       ; command using data memory
block 1
         AND    #0x78, A
``` wherein the DM1 block is in a normal state because power is supplied to DM1 in advance by "PSM DM1, ON" (at this time, a power_ON command has to be inserted by taking into account the "Power_ON latency" time). Thus, "LD *(0×1234), A" command can be executed without "power_ON latency" time.

As described above, the present invention can control dynamic power consumption and static power consumption in a DSP in modules, which are fine, thereby reducing overall power consumption.

That is, in accordance with the present invention, a PSMSR (PSM Status Register) sets/resets bits of a corresponding module in accordance with a PSM command upon receipt of the PSM command, a PSMFR (PSM Flag Register) sets bits of a corresponding module upon receipt of module information required to execute a general command, and then if the bits of the corresponding module are not set to 1 in the PSMSR, a pipeline control signal (pipeline stall) is outputted to stop the execution of the pipeline and then set the bits of the corresponding module to 1 in the PSMSR, then the execution of the pipeline is restarted when the corresponding module getting power reaches a normal state. As a result, dynamic power consumption and static power consumption are controlled in modules, which are fine, thereby reducing overall power consumption.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the particular embodiments, it will be apparent to those skilled in the art that various changes and modifications may be made without departing from the spirit and scope of the invention as defined in the following claims.

What is claimed is:

1. A power management system of a digital signal processor, the system comprising:
   a command decoding device for decoding a program into which a PSM (Power Saving Mode) command and a general command are inserted and transmitting module information required for execution of a corresponding command to a power management control apparatus at the time of decoding the corresponding command;
   a pipeline control device for blocking and restarting transmission of data through a pipeline upon receipt of a pipeline control signal (pipeline stall) from the power management control apparatus; and
   the power management control apparatus for controlling power in respective modules by setting/resetting corresponding bits of a PSM status register and a PSM flag register in accordance with the PSM command and the general command decoded in the command decoding device.

2. The system of claim 1, wherein the power management control apparatus sets/resets bits of a corresponding module in the PSM status register upon receipt of the PSM command decoded in the command decoding device and setting bits of a corresponding module in the PSM flag register upon receipt of module information required to execute a general command from the command decoding device to control power supply to the corresponding module depending on the status of the bits of the corresponding module of the PSM status register and the PSM flag register.

3. The system of claim 2, wherein the power management control apparatus controls power supply to the corresponding module depending on the status of the bits of the corresponding module of the PSM status register and the PSM flag register,
   wherein if the bits of the corresponding module of the PSM status register are set, the bits of the corresponding module of the PSM flag register are set to control power supply to the corresponding module, and if the bits of the corresponding module of the PSM status register are not set, the bits of the corresponding module are set in the PSM flag register and a pipeline control signal (pipeline stall) is transmitted to the pipeline control device to stop the execution of a pipeline and then the bits of the corresponding module are set in the PSM status register to control power supply to the corresponding module.

4. The system of claim 1, wherein upon receipt of an external control signal PSM_EN capable of enabling/disabling the execution of a PSM command from the outside of the digital signal processor, the command decoding device executes the PSM command if the external control signal is a control signal enabling the execution of the PSM command, and the command decoding device ignores the PSM command if the external control signal is a control signal disabling the execution of the PSM command.

5. The system of claim 1, wherein the PSM command is inserted into a program based on result of simulation.

6. The system of claim 1, wherein the PSM command is inserted into a program based on result of simulation and power profiling of the program.

7. A power management method of a digital signal processor, the method comprising the steps of:
- a) upon receipt of a PSM command, setting/resetting bits of a corresponding module in a PSM status register in accordance with the PSM command;
- b) setting bits of a corresponding module in a PSM flag register upon receipt of module information required to execute a general command; and
- c) controlling power in respective modules depending on the status of the bits of the corresponding module of the PSM status register and the PSM flag register.

8. The method of claim 7, wherein the step c) of controlling power includes the steps of:
- c1) checking the bits of the corresponding module in the PSM status register;
- c2) executing the general command if the bits of the corresponding module are set as the result of the checking; and
- c3) if the bits of the corresponding module are not set as the result of the checking, setting the bits of the corresponding module in the PSM flag register to stop the execution of a pipeline by using a pipeline control signal (pipeline stall), and then setting the bits of the corresponding module in the PSM status register to control power supply to the corresponding module.

9. The method of claim 7, wherein a decoding process is performed for decoding the general command, and the module information is received in the decoding process so that the module information can be processed immediately without time delay upon input of the corresponding general command to a power management unit.

10. The method of claim 9, wherein the PSM command is inserted into a program based on result of simulation.

11. The method of claim 9, wherein the PSM command is inserted into a program based on result of simulation and power profiling of the program.

12. A power management control apparatus of a digital signal processor, the apparatus comprising:
- a PSM status register for storing bits of a corresponding module in accordance with a PSM command;
- a PSM flag register for storing bits of a corresponding module in accordance with a general command; and
- a power management controller for setting/resetting bits of the PSM status register and the PSM flag register in accordance with a PSM command and a general command decoded by an external command decoding device to control power in respective modules.

13. The apparatus of claim 12, wherein the PSM command is inserted into a program based on result of simulation.

14. The apparatus of claim 12, wherein the PSM command is inserted into a program based on result of simulation and power profiling of the program.

* * * * *